(12) United States Patent
Kemmler et al.

(10) Patent No.: US 6,752,171 B1
(45) Date of Patent: Jun. 22, 2004

(54) CONTROL-VALVE DRIVE WITH SENSOR UNIT FOR DETECTING THE POSITION OF THE VALVE

(75) Inventors: Lothar Kemmler, Mörfelder-Walldorf (DE); Stefan Kolbenschlag, Darmstadt (DE); Walter Schneider, Wetzlar (DE)

(73) Assignee: Samson Aktiengesellschaft, Frankfurt (DE)

( * ) Notice: Subject to any disclaimer, the term of this patent is extended or adjusted under 35 U.S.C. 154(b) by 120 days.

(21) Appl. No.: 10/049,965

(22) PCT Filed: Jul. 25, 2000

(86) PCT No.: PCT/DE00/02446

§ 371 (c)(1),
(2), (4) Date: Feb. 19, 2002

(87) PCT Pub. No.: WO00/14750

PCT Pub. Date: Mar. 1, 2001

(30) Foreign Application Priority Data

Aug. 20, 1999 (DE) ......................... 199 39 497

(51) Int. Cl.⁷ ............................................. F16K 37/00
(52) U.S. Cl. ...................... 137/552; 137/554; 251/61.4
(58) Field of Search ................................ 137/554, 552; 251/61.4

(56) References Cited

U.S. PATENT DOCUMENTS

| | | | |
|---|---|---|---|
| 3,390,943 A | * 7/1968 | Myers | 137/554 |
| 3,859,619 A | * 1/1975 | Ishihara et al. | 137/554 |
| 4,471,304 A | 9/1984 | Wolf | |
| 4,777,979 A | * 10/1988 | Twerdochlib | 137/554 |
| 4,794,841 A | 1/1989 | Kemmler et al. | |
| 4,967,792 A | * 11/1990 | Magee | 137/552 |
| 4,992,733 A | 2/1991 | Griebeler | |
| 5,144,977 A | * 9/1992 | Eggerton et al. | 137/554 |
| 5,197,508 A | 3/1993 | Göttling et al. | |
| 5,359,288 A | 10/1994 | Riggs et al. | |
| 5,670,876 A | 9/1997 | Dilger et al. | |
| 5,918,199 A | 6/1999 | Yang et al. | |
| 6,050,296 A | * 4/2000 | Hoffmann et al. | 137/552 |
| 6,101,920 A | 8/2000 | Leonhardt | |
| 6,246,331 B1 | * 6/2001 | McHugh et al. | 340/606 |
| 6,331,772 B1 | 12/2001 | Windte et al. | |

FOREIGN PATENT DOCUMENTS

| | | |
|---|---|---|
| CH | 682349 | 8/1993 |
| DE | 33 24 584 | 1/1984 |
| DE | 36 67 068 | 12/1987 |
| DE | 41 05 705 | 9/1992 |
| DE | 196 21 087 | 11/1997 |
| DE | 196 48 335 | 6/1998 |
| DE | 197 01 069 | 7/1998 |
| DE | 197 01 137 | 7/1998 |
| DE | 198 01 092 | 5/1999 |
| EP | 0 478 394 | 4/1992 |
| EP | 0 618 373 | 10/1994 |
| EP | 0 651 192 | 5/1995 |
| EP | 0 870 932 | 4/1997 |
| EP | 0 916 853 | 5/1999 |
| GB | 2 265 228 | 9/1993 |
| WO | WO 94/07037 | 3/1994 |
| WO | WO 95/01510 | 1/1995 |
| WO | WO 95/08071 | 3/1995 |

OTHER PUBLICATIONS

Standard DIN IEC 534 Part 6, 1997, pp. 1–12.

* cited by examiner

*Primary Examiner*—A. Michael Chambers
(74) *Attorney, Agent, or Firm*—Schiff Hardin LLP

(57) ABSTRACT

A drive for a control valve has a drive force unit, a yoke for connecting to a valve in a fixed manner, a drive spindle for transmitting the movement of the drive force unit to the valve and a sensor unit for detecting the position of the valve. The sensor unit includes a magnetic track with a reoccurring structure which is integrated into the drive spindle, a sensor which is connected to the yoke of the drive in the vicinity of the magnetic track, which is suitable for detecting the changing magnetic field lines and at least one permanent magnet in the area of the magnetic track and the sensor, whose magnetic field lines penetrate both the magnetic track and the sensor.

24 Claims, 3 Drawing Sheets

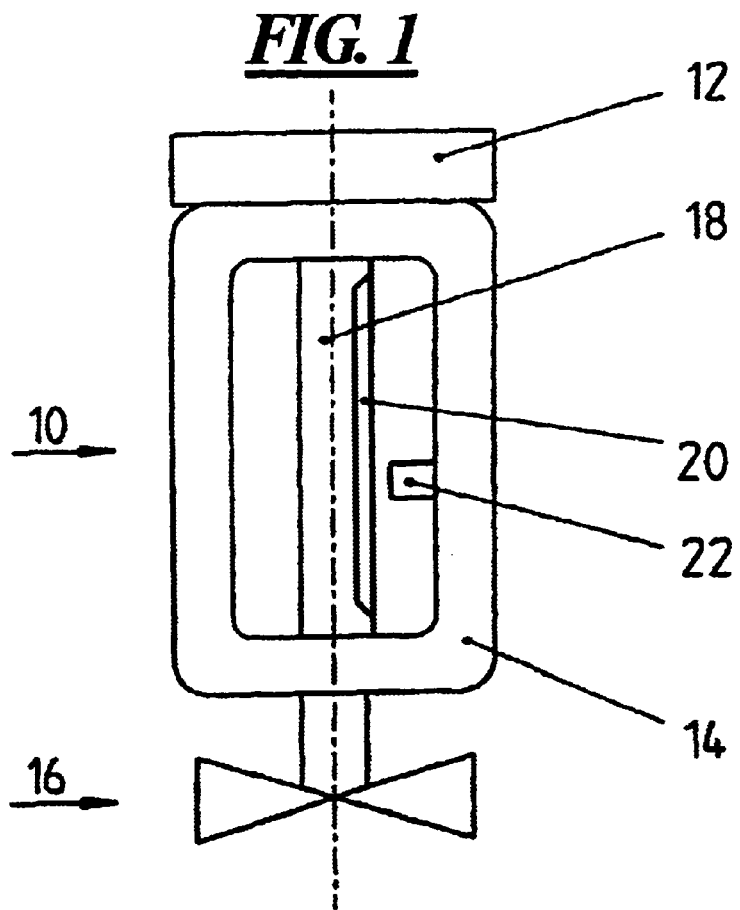
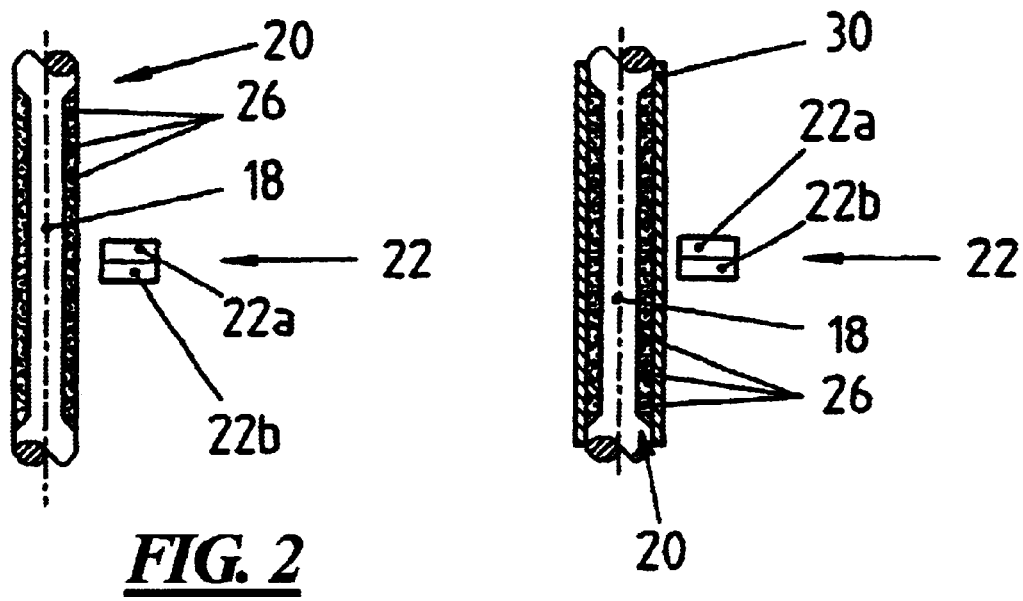

CONTROL-VALVE DRIVE WITH SENSOR UNIT FOR DETECTING THE POSITION OF THE VALVE

BACKGROUND OF THE INVENTION

The invention is directed to a drive of a control valve which includes a drive force unit, a yoke for the fixed connection to a valve, a drive spindle for the transmission of the motion of the drive force unit onto the valve and a sensor unit for acquiring the valve position. The sensor unit is integrated in the drive spindle and comprises a magnetic track having a periodic structure, a sensor connected to the yoke of the drive close to the magnetic track with the sensor being suitable for the acquisition of changing magnetic field lines, and at least one magnet in the region of the magnetic track and of the sensor with the magnet having magnetic field lines penetrating both the magnetic track and the sensor.

Such drives, for example, are operated pneumatically, hydraulically or electrically. The drive force unit converts electrical, thermal or mechanical energy into a motion of the drive spindle in order to generate a thrust or a rotation. The sensor unit for measuring the valve position is usually mechanically coupled to the drive spindle. The actual position of the valve can be monitored with the assistance of this sensor unit and can be controlled with a position controller that frequently contains the sensor unit.

Regardless of whether a non-contacting measuring principle such as, for example, a linear armature sensor, an optically incremental sensor or a contacting system such as, for example, conductive plastic is utilized in the sensor unit itself, the motion of the drive spindle is usually converted with a mechanical tap into a motion at a sensor of the sensor unit. The type of mechanical tap and the structure of the position controller for linear motions at drives is described in the standard DIN IEC 534 Part 6. In accord therewith, a connecting member for the return at the drive is provided at the working spindle, this comprising four M6 threaded holes—given rotatability of the connector member, two holes per side suffice—with a bearing area of at least 10 mm diameter for each threaded hole. The mounting material for coupling a position controller to the sensor is co-supplied by the manufacture of the position controller. It usually comprises a lever that is rotatably coupled to the sensor and a dog that is rigidly connected to the drive spindle and engages into the rotatable lever. The attachment of the sensor with the mounting material requires careful assembly and adjustment in order to avoid historesis and in order to correctly select the working range.

On the other hand, EP 0 870 932 A1 discloses a pneumatic or hydraulic cylinder with a cylinder tube, whereby at least one permanent magnet is arranged at a piston, and this magnet uses its magnetic field to actuate at least one signal generator at the outside of the cylinder tube. The signal generator is thereby secured so that it serves as a limit signal generator. The known fastening enables a comfortable displacement and adjustment of the signal generator in order to exactly set the switching points. The shape, nature and arrangement of the permanent magnet, however, is not disclosed.

U.S. Pat. No. 5,670,876 discloses a magnetic position sensor that comprises two magnetic sensors, whereby the one sensor acquires a non-variable flux, and the other sensor measures the modification of the magnetic resistance ("reluctance") over the range of measurement. The variable magnetic resistance in that the part whose motion is to be acquired has a specific shape or is connected to an article with such a specific shape, so that the magnetic flux occurs by means of a continuous variation of, for example, the air gap length or the air gap width. The magnetic return has a characteristic shape therefor.

Another magnetic position sensor is disclosed by U.S. Pat. No. 5,359,288 for determining the position of shock absorbers. A Hall sensor thereby measures the strength of a magnetic field as a criterion of the position, and the magnetic region, that moves relative to the hole sensor, is composed of sub-regions having different magnetization, so that the resulting field strength at the Hall sensor continuously varies according to the position.

Magnetic field sensors, particularly magneto-resistive sensors, are likewise known that can be greatly miniaturized. Thus, DE 197 01 137 A1 discloses a length sensor chip whose plane resides opposite a scale plane. Magnetostrictive layer strips having barber pole structures are thereby arranged on the sensor chip in a specific way and fashion in order to be suitable for a high-resolution length measurement with high sensitivity given high resistance.

EP 0 618 373 A1 discloses a drive of the species with a device for determining the position of a magnetizable piston rod in a cylinder relative to a selected reference point. This device comprises a magnet for generating a magnetic field as well as a periodic arrangement of grooves on the piston rod that effect a modulation of the field generated by the magnet. This periodic modulation is sampled via two magnet resistors integrated in a bridge circuit and is electronically processed so that an analog position display is available in addition to the digital and a stroke speed can be read out.

In addition, CH 682 349 A5 discloses a magnetic measurement sensor for acquiring the position, speed and moving direction of a piston or cylinder that detects a flux density change of a magnetic field by means of a periodically profiled, magnetizable piston or cylinder rod. The magnetic flux density is thereby generated via a permanent magnet.

What is disadvantageous about the above devices is that the drive force units for actuators comprise no devices that undertake measures given a power outage in order to enable the continued defined and error-free operation of the actuator or, respectively, to move the actuator, for example in the form of a piston or cylinder rod, into a defined position. Thus, these devices are unsuitable for the control of control valves having high safety demands.

DE 196 21 087 A1 discloses an analog safety circuit for actuators based on RC or, respectively, RL elements that is essentially characterized by two characteristic times. These are thereby a matter of a first, short so-called hold time during which the actuator—given power outage—is moved into an undefined idle position and of a second, longer hold time during which the actuator is driven into a safe intermediate position in which it should dwell long enough for a service person or an automatic unit to undertake further measures for the protection of a system operated with actuators, particularly measures for further wind-down of the system.

This device also does not enable a defined continued operation of an actuator in the form of a drive in combination with a control valve given interruption of the mains power supply. Further, it can only be utilized for electrically operated actuators.

SUMMARY OF THE INVENTION

It is therefore an object of the present invention to develop the drive of the species such that the disadvantages of the prior art are overcome, in particular that a non-electrically operated drive that uses an incremental path sensor system is supplied for a control valve that enables the defined and safe continued operation of the control valve even after outage of an auxiliary energy, for example in the form of a mains power supply.

This object is inventively achieved with an improvement in a drive with a drive force unit, a yoke for the fixed connection to a valve, a drive spindle for the transmission of the motion of the drive force unit onto the valve and a sensor unit for acquiring the valve position, the sensor unit being integrated in the drive spindle and comprising a magnetic track having a periodic structure, a sensor connected to the yoke of the drive close to the magnetic track, the sensor being suitable for the acquisition of changing magnetic field lines, and at least one magnet in the region of the magnetic track and of the sensor, the magnet having magnetic field lines penetrating both the magnetic track and the sensor. The improvements are that the drive is coupled to a control valve, the magnet is a permanent magnet, the sensor can be supplied with energy via an auxiliary energy source, the sensor is connected to a unit for monitoring the electrical auxiliary energy source, the drive includes an energy store for supplying the sensor with electrical energy, the energy store is connected to the sensor at least during an outage of the electrical auxiliary energy, so that the energy store makes it possible to continue the position measurement of the valve position even when outage of the electrical auxiliary energy for at least a characteristic time.

The sensor is connected to a logic circuit which may be in a microprocessor of the sensor and which is connected to a timing unit and generates a signal for the drive unit after a predetermined time when the outage of the electrical auxiliary energy to force the drive spindle into a safe position.

The invention is thus based on the surprising perception that, by offering an energy store in combination with the drive of a control valve for a characteristic or predetermined time, a continued operation of this control valve is enabled by bridging a power outage for a short period of time. For example, with an outage of the auxiliary electrical energy, the control valve is only moved into a safe, defined position after a given, long-lasting outage. After a short-duration outage, the device can thus continue operating without interruption and need not be re-started, i.e. the original position need not be reset such as, for example, by registering initialization data, which in turn proves complex given precision processes upon employment of control valves and cost-intensive due to the time losses that are thereby incurred. All safety reservations in the employment of incremental path sensors in combination with control valves are thus overcome by the invention.

Further features and advantages of the invention derive from the following description wherein exemplary embodiments of the invention are explained in detail on the basis of schematic drawings.

BRIEF DESCRIPTION OF THE DRAWINGS

FIG. 1 is a sectional view of a first embodiment of a drive of the invention;

FIG. 2 is a detailed sectional view of a drive spindle according to a second embodiment of the invention;

FIG. 3 is a detailed sectional view of a drive spindle according to a third embodiment of the invention;

DESCRIPTION OF THE PREFERRED EMBODIMENTS

Figure 4:
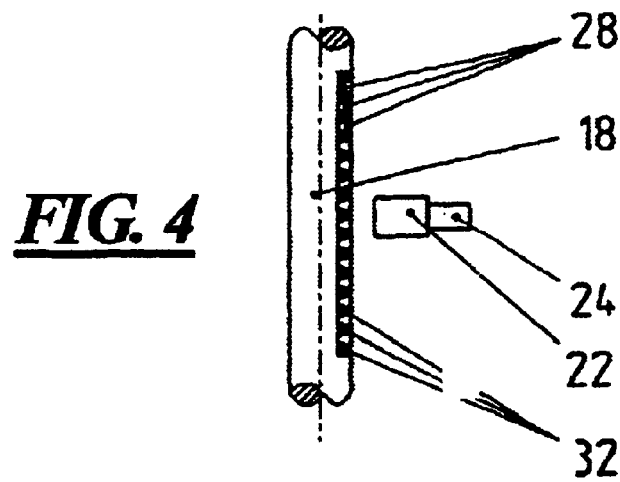
FIG. 4 is a detailed sectional view of a drive spindle according to a fourth embodiment of the invention.

FIG. 1 shows the preferred embodiment of a drive 10 of the invention. In accord therewith, a drive force unit 12 that generates a linear thrust motion acts via a drive spindle 18 on a valve 16, and a yoke 14 serves for the fixed connection of the drive force unit 12 to the valve 16.

A magnetic track 20 having a periodic structure is contained integrated in the drive spindle 18, whereas the yoke 14 of the drive 10 comprises a sensor 22 close to the magnetic track 20. The sensor 22 is suitable for the acquisition of changing magnetic field lines. The outside diameter of the drive spindle 18 is essentially constant over the entire extent thereof. A permanent magnet (not shown), whose magnetic field lines penetrate both the magnetic track 20 as well as the sensor 22, is present in the region of the magnetic track and of the sensor 22. The permanent magnet can be arranged both in the drive spindle 18 as well as close to the sensor 22, for example on a side facing away from the magnetic track 20 (see the embodiment of FIG. 4).

Given the embodiment according to FIG. 2, the magnetic track 20 faces toward the sensor 22. The drive spindle, further, is essentially composed of a non-magnetic, metallic rod whose metallic part is drawn down to a reduced diameter in a sub-region. The rod is extrusion coated with a plastic in this sub-region so that the outside diameter is constant over the entire extent of the drive spindle 18. For manufacturing the magnetic track 20, the plastic, which contains ferritic fillers, is magnetized with strong magnetic fields after the extrusion coating. It thereby suffices to produce the magnetic track 20 along a narrow strip lying opposite the sensor 22 instead of magnetizing the plastic over the entire circumference, so that the magnetic track 20 is itself durably magnetic and comprises a periodic structure having magnet poles 26 arranged at equidistant intervals. The sensor 22 comprises two magneto-resistive sensors 22a, 22b that are offset relative to one another in a direction of movement of the drive spindle 18. Due to the arrangement of at least two sensors 22a, 22b, the moving direction can also be determined. Further, the evaluation of two sensors 22a, 22b enables a suppression of noise quantities, since noise influences such as foreign magnetic fields or the distance dependency from the magnetic track 20 affect both sensors 22a, 22b in the same way.

It is provided in the embodiment according to FIG. 2 that the two magneto-resistive sensors 22a, 22b comprise a plurality of magneto-resistive regions connected in the form of a Wheatstone bridge circuit. The magneto-resistive regions in the various bridge branches of the Wheatstone bridge circuit are thereby turned in different directions, as known from the barber pole structure, so that the direction of current is slanted compared to the direction of motion of the drive spindle 18. This type of sensor design enables an especially good resolution. The anisotropic magneto-resistive effect (AMR effect) is thereby utilized, in accord wherewith the resistance of a magneto-resistive layer is dependent on the angle between the current density and the magnetization. This type of position identification is a matter of an incremental path measuring system, i.e. the magnetic track acts as a scale that contains no absolute information about the position, so that the valve position is determined with a counter or, respectively, a memory. The precision can also be enhanced by interpolation, so that the resolution lies clearly below the cycle length of the magnetic track.

FIG. 3 shows a drive spindle 18 whose magnetic track 20 and whose sensor 22 correspond to the embodiment of FIG. 2; additionally, however, an envelope composed of a thin-wall, non-magnetic tube 30 is provided. This tube 30 can be composed of a rust-free steel or stainless steel and is either slipped over the rod or is placed around the drive spindle as a sheet and is welded along the joining edge with a seam. The advantage of a tube 30 as an envelope of the magnetic track 20 is in the smooth surface of the tube 30. In particular, the transitions from the magnetic track 20 to the drive spindle 18 can be covered with tube and can thus be realized extremely smooth. The smoothness is important in order to keep the friction of the drive spindle 18 in seals and, thus, a wear of the seals low.

Another embodiment of a drive spindle 18 with a magnetic track 20 is shown in FIG. 4 and is fashioned so that the magnetic track 20 comprises soft-magnetic material 32 that is arranged at equidistant intervals in the moving direction of the drive spindle 18. The interspaces between this periodic, soft-magnetic structure formed by the material 32 are filled with non-magnetic plastic 28 in order to achieve a smooth surface of the drive spindle 18. The magnetic field in this version is generated by a permanent magnet 24 whose magnetic field lines penetrate both the magnetic track 20 as well as the sensor 22. The permanent magnet 24 is connected to the sensor 22 or integrated therein at that side facing away from the magnetic track 20.

In an alternative version (not shown), the drive spindle is formed by a soft-magnetic threaded rod or a toothed rod, so that the magnetic track is prescribed by the structure of notches formed by the threads or, respectively, teeth.

Figure 5:
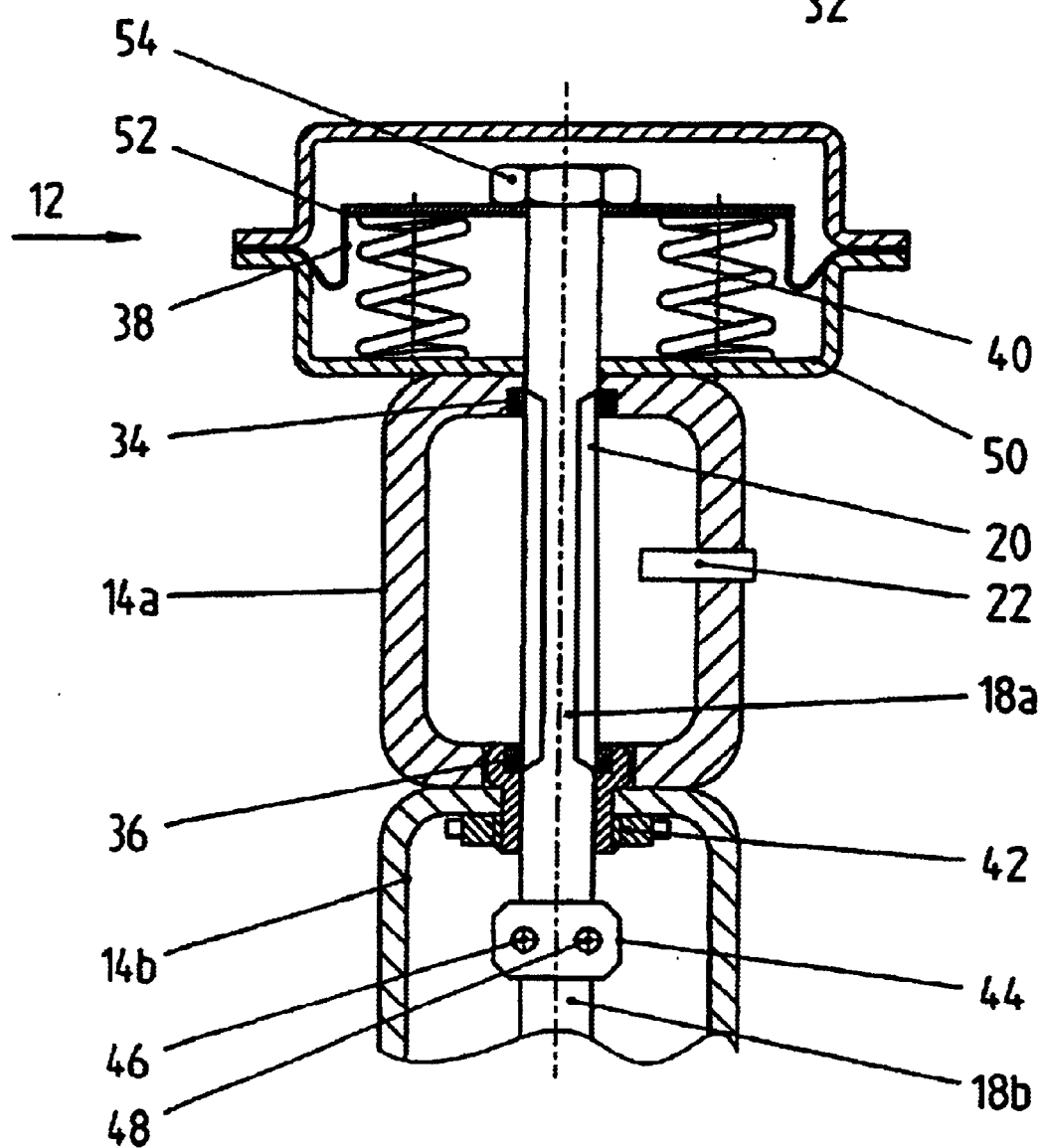
FIG. 5 is a sectional view of a fifth embodiment of an inventive drive.

Another advantageous embodiment of the invention is shown in FIG. 5. The drive force unit 12 is thereby a pneumatic drive that has a membrane 38 for charging with a pressure. The membrane 38 is rigidly connected via a membrane dish 52 and a screw 54 to a bipartite or two-part drive spindle 18a, 18b, whereby the upper drive spindle 18a is secured to the membrane dish 52 by the screw 54 and the lower drive spindle 18b is connected to a valve (not shown). The output drive spindle 18a and the lower drive spindle 18b are coupled to one another via a coupling 44 and screws 46, 48. The control pressure acts above the membrane 38 between a drive housing 50 and the membrane 38. The drive 12 contains spring elements 40 that press the membrane 38 together with membrane dish 52 and the bipartite drive spindle 18a, 18b upward in FIG. 5. Given an outage of the pneumatic control pressure, the drive spindle 18a, 18b in FIG. 5 moves upward into the drive 12, so that the valve has a defined safety position. The yoke is likewise divided into two parts with an upper yoke 14a and a lower yoke 14b that are connected with a union nut 42.

A sensor 22 is arranged close to the magnetic track 20. The sensor 22 is secured to the upper yoke 14a and detects the variation of the magnetic field strength given motion of the drive spindle 18a, 18b. The upper yoke 14a can be modified to form a closed housing by mounting a front and back cover (not shown in FIG. 5), and the closed housing surrounds the magnetic track and the sensor 22 on all sides. Seals 34, 36 are arranged at the top and bottom in the upper yoke 14a, and are arranged around the upper drive spindle 18a to seal the enclosed space off from both the drive 12 as well as from the atmosphere. As a result thereof, the magnetic track and the sensor 22 are protected against contamination, particularly due to magnetic splinters or dust. The magnetic track 20 extends over the region of the upper yoke 14a and, to this extent, wipes the seals 34, 36 given movement of the upper drive spindle 18a. Since the outside diameter of the upper drive spindle 18a is constant over its entire extent and is produced with a smooth surface, the presence of the magnetic track 20 does not lead to any increased wear at the seals 34, 36. As a result thereof, it is possible to design the upper yoke 14a with minimal extent in moving direction of the upper drive spindle 18a. If, namely, the surface in the transition of magnetic track/spindle were not smooth, then the upper yoke 14a would have to be designed so large that the seals 34, 36 during the valve stroke are not touched by the magnetic track 20. The sensor 22 comprises a microprocessor and a memory unit (not shown) for acquiring and analyzing the change in the magnetic field lines. It is thereby preferred when the sensor 22 has an integrated circuit (not shown), so that the signal processing ensues as close as possible to the sensor 22 and has only slight dimensions. The output signal of the sensor 22 represents the valve position and is communicated to a position controller (not shown).

Figure 7:
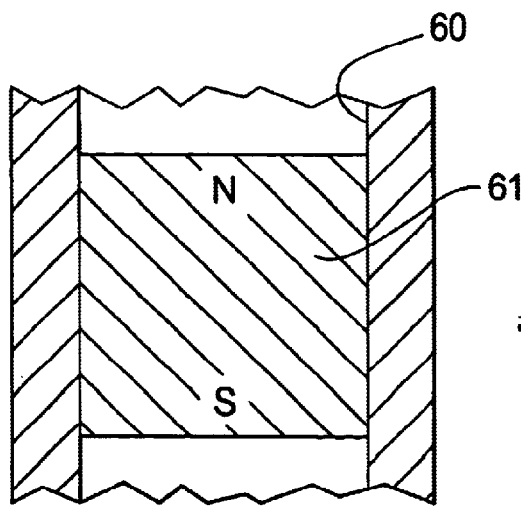
FIG. 7 is a detailed sectional view of another embodiment of the drive spindle.

According to a further embodiment (see FIG. 7), the drive spindle comprises a hollow region, for example in the form of an axial bore 60, into which a plastic-bonded magnet 61 is introduced. Advantageously, the magnetic track can thereby be generated by magnetization of a ferrite-filled plastic separate from the drive and subsequent introduction as a plastic-bonded magnet into the drive spindle. This reduces transitions on the surface of the drive spindle, so that seals are again not jeopardized by the magnetic track.

It is likewise advantageous when the drive spindle has a notch in its surface into which a plastic-bonded magnet terminating with the surface is placed.

Figure 6:
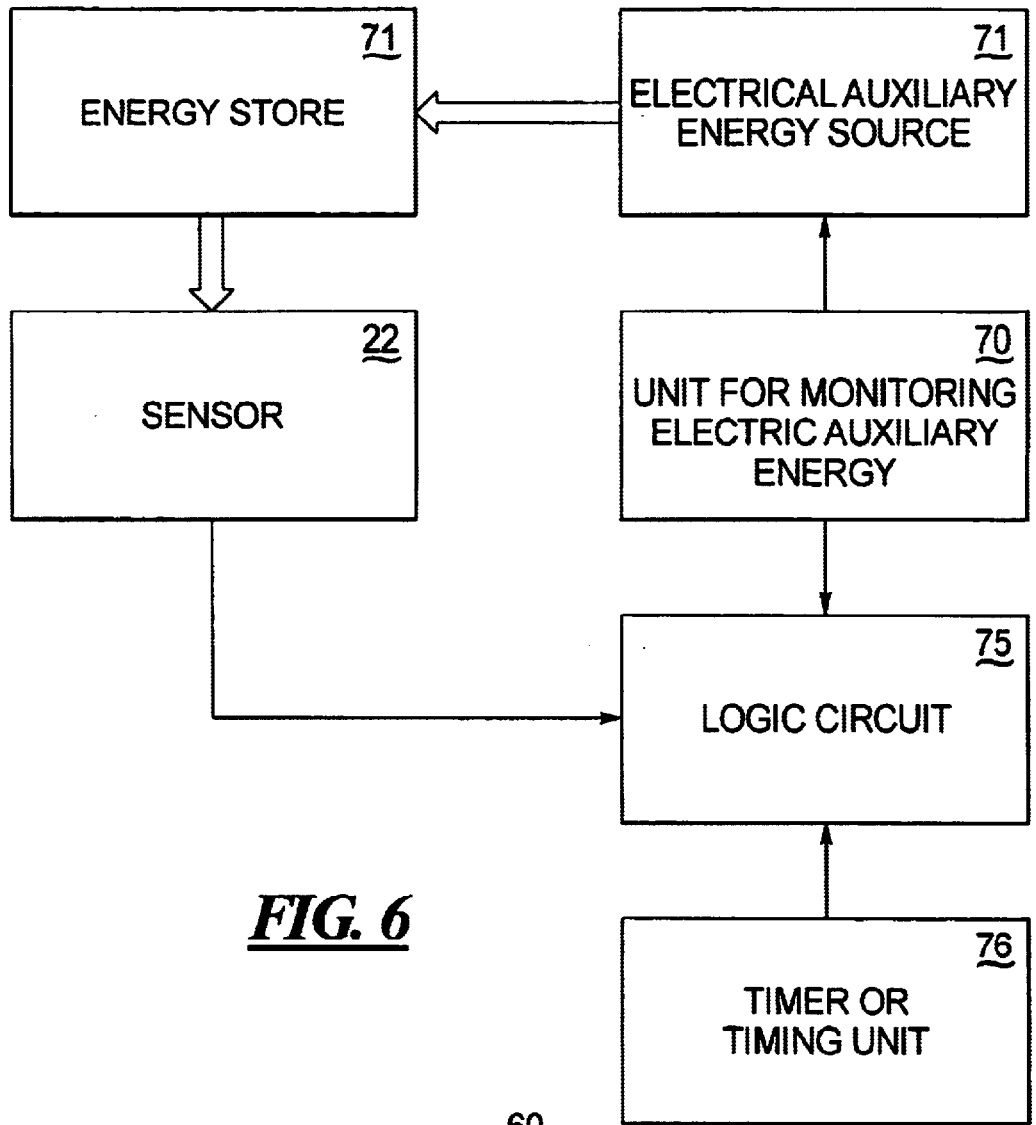
FIG. 6 is a diagram showing the connection of the sensor to an energy store, the logic circuit, a monitoring unit, an electrical auxiliary energy source and a timing unit.

According to the invention (see FIG. 6), a unit 70 for monitoring the electrical auxiliary energy of the electrical auxiliary energy source 71 is connected to the sensor 22. In addition, a version is inventively provided that comprises an energy store 72 for supplying the sensor with electrical energy that is electrically connected to the sensor at least during an outage of the electrical auxiliary energy. This energy store 72 can be realized as a capacitor or as an accumulator or as a battery. The energy store 72 makes it possible to continue the position measurement of the valve position even given an outage of the electrical auxiliary energy, at least for a transition time. This is advantageous since, due to the incremental measuring principle, the sensor 22 cannot draw conclusions about the valve position only from the momentary physical signal. When the auxiliary energy returns before the energy store no longer supplies the sensor, then the drive together with valve can remain operating without interruption. The energy store 72 thus makes it possible to either completely bridge the time span of the outage of the electrical auxiliary energy or to move the valve into a safe position after a characteristic or predetermined time or dependent on the energy supply of the energy store 72.

In another embodiment of the invention, the sensor 22 is connected to a logic circuit 75 or this is integrated in a microprocessor. This logic circuit 75 forces the drive spindle—given an outage of the electrical auxiliary energy—into a safety position in that it generates signals for the drive force unit. The safety position is the limit position of the valve, for example the position of "valve closed".

Alternatively, the logic circuit 75 is connected to a timer or timing unit 76, which generates signals for the drive force unit given an outage of the electrical auxiliary voltage after a characteristic time has passed that force the drive spindle into a safety position. It can likewise be provided in one version that the logic circuit 75, given an outage of the electrical auxiliary energy, generates a signal for the drive force unit that force the drive spindle into a safety position and subsequently generates the signals for the drive force unit given the return of the electrical auxiliary energy that move the drive spindle over the entire working range and accepts initialization data. It can also be inventively provided that the logic circuit 75, given an outage of the electrical auxiliary energy, drives pneumatic blocking relays that hold a pneumatic drive force in position.

In order to realize a defined reference point for the valve position, a trigger different from the magnetic track is integrated in the drive spindle in an additional version (not shown) of the invention. The trigger triggers a characteristic signal in one position of the drive spindle. This is particularly meaningful when the limit safety position does not offer a mechanically defined stop. This trigger, for example, can be arranged lying opposite the magnetic track. It is also provided for this purpose that the yoke comprises an additional sensor for acquiring the position of the trigger. Given utilization of an above-described logic circuit that generates signals for the drive force unit given the outage of the electrical auxiliary energy that force the drive spindle into a safety position, so that signals for the drive force unit are generated subsequently when the electrical auxiliary energy returns that moves the drive spindle over the entire working range and picks up initialization data, this reference point can be realized both by mechanical limit position or can be defined with an additional sensor via an additional trigger as described above. The motion of the drive spindle over the entire working range assures that the path sensor also exhibits a correct reference point after outage of the auxiliary energy. By comparison to the original initialization data, further, conclusions can be drawn about possibly existing errors and an error message can be output as warranted.

The drive of the invention enables an especially simple coupling of the path sensor or the position controller to the drive spindle. It is not a mechanical connection and adjustment is thus not necessary, since the path sensor works in non-contacting fashion. The incremental basic principle is also advantageous since no mechanical balancing of the limit positions is needed. The magnetic track can be designed longer than the working region for compensating tolerances during assembly without the resolution within the working region being thereby reduced. A position controller with the inventive drive can be placed in operation in largely automated fashion, whereby errors are precluded and time and cost advantages simultaneously arise.

We claim:

1. A drive comprising a drive force unit, a yoke for the fixed connection to a valve, a drive spindle for the transmission of the movement of the drive force unit onto the valve and a sensor unit for acquiring the valve position, the sensor unit being integrated in the drive spindle comprising a magnetic track having a periodic structure extending along the moving direction of the drive spindle, a pair of sensors connected to the yoke of the drive close to the magnetic track and being offset relative to one another along the moving direction, said sensors being suitable for the acquisition of changing magnetic field lines and at least one magnet in the region of the magnetic track and sensors, said magnet having magnetic field lines penetrating both the magnetic track and the sensors, the drive being coupled to the control valve, the magnet being a permanent magnet, the sensors being supplied with electrical auxiliary energy via an electrical auxiliary energy source, the sensors being connected to a unit for monitoring the electrical auxiliary energy of the source, an energy store for supplying the sensors with electrical energy, said energy store being connected to the sensors at least when an outage of the electrical auxiliary energy occurs so that the energy store makes it possible to continue the position measurement of the valve position, even during outage of the electrical auxiliary energy, for at least a predetermined time.

2. A drive according to claim 1, wherein the sensors are connected to a logic circuit and the logic circuit is connected to a timing unit which generates signals for the drive force unit after a characteristic time has passed given the outage of the electrical auxiliary energy, said signals forcing the drive spindle into a safety position.

3. A drive according to claim 1, wherein the drive spindle comprises an essentially constant outer diameter and an essentially smooth surface over at least the sub-region that contains the magnetic track.

4. A drive according to claim 1, wherein the drive spindle contains a permanent magnet.

5. A drive according to claim 1, wherein the sensors are connected to a permanent magnet on a side facing away from the magnetic track.

6. A drive according to claim 1, wherein the magnetic track is durably magnetic and the periodic structure is essentially formed by magnetic poles arranged at equal distance intervals.

7. A drive according to claim 1, wherein the drive spindle comprises a non-magnetic, metallic rod, whose metallic part is drawn down to a reduced diameter in a sub-region, and the rod is extrusion-coated in the sub-region with a plastic that has an outside diameter of the drive spindle essentially constant at least over the magnetic track.

8. A drive according to claim 7, wherein the plastic contains a ferritic filler that can be magnetized in order to form a magnetic track in the form of a plastic-bonded magnetic pole.

9. A drive according to claim 7, wherein the plastic is non-magnetic and fills out interspaces between periodic structures of the soft-magnetic material in order to form the magnetic track.

10. A drive according to claim 1, wherein the drive spindle comprises a hollow region into which a plastic is introduced so that the outside diameter of the drive spindle is essentially constant, at least over the magnetic track.

11. A drive according to claim 1, wherein the drive spindle comprises a hollow region, preferably in the form of an axial bore, into which a plastic-bonded magnet is introduced for forming the magnetic track.

12. A drive according to claim 1, wherein the drive spindle has a notch in the surface into which a plastic-bonded magnet terminating with the surface is provided for forming the magnetic track.

13. A drive according to claim 1, wherein the drive spindle is constructed of a soft magnetic rod having a series of notches selected from threads and teeth so that the magnetic track is prescribed by a structure of the notches.

14. A drive according to claim 1, wherein the drive spindle is surrounded by a thin wall, non-magnetic tube at least in the sub-region that contains the magnetic track.

15. A drive according to claim 1, wherein the sensors and the part of the drive spindle that carries the magnetic track are arranged essentially within a closed housing.

16. A drive according to claim 1, wherein the drive spindle is constructed of two parts, with one part of the drive spindle having the magnetic track being connected to a membrane and the other part of the drive spindle being connected to the valve, the yoke being fashioned in two yoke parts, whereby one yoke part essentially harbors the one drive spindle, carries the sensors and has covers to essentially close the housing for the magnetic track and the magnetic sensors.

17. A drive according to claim 1, wherein the sensors are connected to a memory unit of a microprocessor for monitoring and analyzing the changing magnetic field lines.

18. A drive according to claim 1, which includes a logic circuit which, when given return of the of the electrical auxiliary energy, generates signals for the drive force unit that moves the drive spindle over the entire working range and accepts initializing data.

19. A drive according to claim 1, wherein the drive spindle contains a trigger different from the magnetic track, said trigger causing a characteristic signal for a position of the drive spindle.

20. A drive according to claim 19, wherein the yoke carries an additional sensor for acquiring the position of the trigger.

21. A drive according to claim 1, wherein a safety position is a mechanical limit position determined by the trigger.

22. A drive according to claim 1, wherein the sensors are connected to an integrated circuit which is part of a position controller.

23. A drive according to claim 1, wherein the sensors comprise at least one magneto-resistive sensor.

24. A drive according to claim 23, wherein the pair of sensors are magneto-resistive sensors and comprise a plurality of magneto-resistive regions connected in the form of a Wheatstone bridge circuit that turn in different directions in the various branches.

* * * * *